US011228833B2

(12) United States Patent
Laaksonen et al.

(10) Patent No.: US 11,228,833 B2
(45) Date of Patent: Jan. 18, 2022

(54) APPARATUS AND ASSOCIATED METHODS FOR PRESENTATION OF AUDIO

(71) Applicant: Nokia Technologies Oy, Espoo (FI)

(72) Inventors: Lasse Laaksonen, Tampere (FI); Arto Lehtiniemi, Lempäälä (FI); Antti Eronen, Tampere (FI); Jussi Leppänen, Tampere (FI)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 15/734,324

(22) PCT Filed: Jun. 17, 2019

(86) PCT No.: PCT/EP2019/065856
§ 371 (c)(1),
(2) Date: Dec. 2, 2020

(87) PCT Pub. No.: WO2020/002023
PCT Pub. Date: Jan. 2, 2020

(65) Prior Publication Data
US 2021/0227320 A1    Jul. 22, 2021

(30) Foreign Application Priority Data

Jun. 26, 2018  (EP) .................................. 18179707

(51) Int. Cl.
*H04R 3/00*    (2006.01)
*H04S 7/00*    (2006.01)
(52) U.S. Cl.
CPC ............. *H04R 3/005* (2013.01); *H04S 7/304* (2013.01); *H04R 2430/21* (2013.01);
(Continued)

(58) Field of Classification Search
CPC ...... H04R 3/005; H04R 5/02; H04R 2430/21; H04S 7/304; H04S 2400/15; H04S 2420/01; H04S 2420/11
(Continued)

(56) References Cited

U.S. PATENT DOCUMENTS 7,783,594 B1 * 8/2010 Pachikov ................ G06F 16/64
707/609
2005/0180578 A1 * 8/2005 Cho .................... H04N 21/2335
381/56
(Continued)

FOREIGN PATENT DOCUMENTS

EP    1779534 A1    5/2007
EP    2061201 A1    5/2009
(Continued)

OTHER PUBLICATIONS

Extended European Search Report received for corresponding European Patent Application No. 18179707.7, dated Nov. 30, 2018, 5 pages.
(Continued)

*Primary Examiner* — William A Jerez Lora
(74) *Attorney, Agent, or Firm* — Nokia Technologies Oy

(57) ABSTRACT

An apparatus comprising means configured to: receive audio content from a remote user device, the audio content comprising primary audio and secondary audio, the secondary audio being different to the primary audio and comprising ambient audio; receive secondary audio importance information associated with said audio content and indicative of an importance of the secondary audio; receive current audio presentation information indicative of at least whether audio from one or more audio sources is currently being presented as spatial audio such that respective audio of the one or more audio sources is to be perceived as originating from one or more respective directions or ranges of directions around the
(Continued)

user; provide for presentation of the primary audio; and provide for presentation of the secondary audio based on the secondary audio importance information and the current audio presentation information.

20 Claims, 5 Drawing Sheets

(52) U.S. Cl.
CPC ....... *H04S 2400/15* (2013.01); *H04S 2420/01* (2013.01); *H04S 2420/11* (2013.01)

(58) Field of Classification Search
USPC .................. 381/2, 56, 58, 105, 124, 306
See application file for complete search history.

(56) References Cited

U.S. PATENT DOCUMENTS

| | | |
|---|---|---|
| 2011/0317825 A1* | 12/2011 | Baird .................. H04M 3/40 379/202.01 |
| 2012/0093006 A1 | 4/2012 | Yang |
| 2012/0166188 A1 | 6/2012 | Chakra et al. |
| 2014/0247945 A1* | 9/2014 | Ramo .................. H04S 3/008 381/17 |

FOREIGN PATENT DOCUMENTS

| | | |
|---|---|---|
| EP | 2879131 A1 | 6/2015 |
| WO | 2006/007546 A1 | 1/2006 |
| WO | 2016/172111 A1 | 10/2016 |

OTHER PUBLICATIONS

International Search Report and Written Opinion received for corresponding Patent Cooperation Treaty Application No. PCT/EP2019/065856, dated Jul. 24, 2019, 14 pages.

* cited by examiner

APPARATUS AND ASSOCIATED METHODS FOR PRESENTATION OF AUDIO

RELATED APPLICATION

This application claims priority to PCT Application No. PCT/EP2019/065856, filed on Jun. 17, 2019, which claims priority to European Application No. 18179707.7, filed on Jun. 26, 2018, Each of which is incorporated herein by reference in its entirety.

TECHNICAL FIELD

The present disclosure relates to the field of presentation of audio and, in particular, to the presentation of audio content, such as telecommunication audio content or immersive telecommunication audio content. The present disclosure also relates to associated apparatus, methods and computer programs.

BACKGROUND

Telecommunication or telephony systems are being developed that provide for more than monophonic capture and presentation of audio. The audio of such telephony may comprise spatial audio. The presentation of such audio may require careful consideration to ensure the telecommunication is clear and effective.

The listing or discussion of a prior-published document or any background in this specification should not necessarily be taken as an acknowledgement that the document or background is part of the state of the art or is common general knowledge. One or more aspects/examples of the present disclosure may or may not address one or more of the background issues.

SUMMARY

In a first aspect of the disclosure there is provided an apparatus comprising means configured to:
  receive audio content from a remote user device, the audio content comprising primary audio and secondary audio, the secondary audio being different to the primary audio and comprising ambient audio;
  receive secondary audio importance information associated with said audio content and indicative of an importance of the secondary audio;
  receive current audio presentation information indicative of at least whether audio from one or more audio sources is currently being presented as spatial audio such that respective audio of the one or more audio sources is to be perceived as originating from one or more respective directions or ranges of directions around a reference point;
  provide for presentation of the primary audio; and
  provide for presentation of the secondary audio based on the secondary audio importance information and the current audio presentation information.

In one or more examples, the reference point is indicative of the location of a user to whom the audio content is presented. In one or more examples, the primary audio comprises voice audio comprising audio determined to be generated by a voice of one or more remote users, such as for telecommunication with the user, and the secondary audio comprises ambient audio comprising audio other than that determined to be generated by the voice of the one or more remote users. In one or more examples, the primary audio comprises spatial audio that includes directional information such that, when presented, it is to be perceived as originating from a direction or range of directions in accordance with the directional information and the secondary audio comprises at least one of audio without said directional information and spatial audio with said directional information that defines a range of directions from which the audio should be perceived greater than a threshold range of directions. In one or more examples, the audio content comprises telecommunication audio content comprising audio content provided for the purpose of telecommunication, which may be via a traditional telecommunication network or provided by a voice over IP or any other packet-based or circuit switched telephony service. In one or more examples in which the primary audio and/or the secondary audio comprises spatial audio, the primary audio may comprise one or more audio channels each associated with respective one or more audio objects, the audio objects each having a defined location from which the associated audio channel, when presented, is to be perceived. In one or more examples, the locations associated with the primary audio are located such and/or have a width that is less than the threshold range of directions. In one or more examples, the locations associated with the secondary audio are located such and/or have a width that is greater than a threshold range of directions.

In one or more examples, said secondary audio importance information is received from the remote user device with said audio content. In one or more examples, said audio content is provided as part of a call between the remote user and a user of the apparatus, and wherein the secondary audio importance information is set by the remote user or automatically determined at least for each call. In one or more examples, said secondary audio importance information is set by the remote user via the remote user device and is based on said audio content. In one or more examples, said secondary audio importance information is determined by and received from a server that receives said audio content from the remote user device.

In one or more examples, the secondary audio importance information defines at least two levels of importance comprising important and unimportant and wherein the apparatus includes means configured to:
  provide for presentation of the secondary audio based on the secondary audio importance information being indicative of the secondary audio being important, said presentation based on the current audio presentation information; and at least one of:
  provide for presentation of the secondary audio based on the secondary audio importance information being indicative of the secondary audio being unimportant and the current audio presentation information being indicative that none of the one or more audio sources are currently presenting audio; and
  provide for non-presentation of the secondary audio based on the secondary audio importance information being indicative of the secondary audio being unimportant and the current audio presentation information being indicative that at least one of the one or more audio sources are currently presenting audio.

In one or more examples, said means are configured to:
  provide for presentation of the secondary audio, based on the secondary audio importance information being indicative of the secondary audio being important and the current audio presentation information being indicative of at least one of the one or more audio sources currently presenting audio, and provide for modification of one or both of a volume or the range of directions with which the audio of at least one of the one or more audio sources is presented to accommodate presentation of the secondary audio.

In one or more examples, said means are configured to: provide for presentation of the secondary audio such that it is perceived as originating from all directions around the user, based on the secondary audio importance information being indicative of the secondary audio being important and the current audio presentation information being indicative that none of the one or more audio sources are currently presenting audio.

In one or more examples, the means configured to provide for presentation of the primary audio as spatial audio such that it is to be perceived as originating from a direction or range of directions that is non-overlapping with a direction or range of directions associated with the audio of the one or more audio sources based on the current audio presentation information.

In one or more examples, the means are configured to:
receive default perceived location information which defines a default perceived location for the audio content;
provide for presentation of at least said primary audio of said audio content as spatial audio to be perceived as originating from said default perceived location.

In one or more examples, the means may be configured, to provide for presentation, if said default perceived location information is not received, of said primary audio of said audio content as spatial audio to be perceived from a direction or range of directions that is non-overlapping with any audio that is presented by the one or more audio sources.

In one or more examples, said means are configured to:
capture user audio content of a user;
send said captured user audio content to the remote user device to provide for telecommunication between the user and the remote user of the remote user device, wherein said user audio content comprises primary audio and secondary audio, the secondary audio being different to the primary audio and comprising ambient audio; and
send secondary audio importance information associated with said user audio content and indicative of an importance of the secondary audio of the user audio content for use by the remote user device, the secondary audio importance information based on user input received from the user.

In one or more examples, the primary audio comprises voice audio comprising audio determined to be generated by a voice of at least the user, such as for telecommunication with the remote user, and the secondary audio comprises ambient audio comprising audio other than that determined to be generated by the voice of the user. In one or more examples, the primary audio comprises spatial audio that includes directional information such that, when presented, it is to be perceived as originating from a direction or range of directions in accordance with the directional information and the secondary audio comprises at least one of audio without said directional information and spatial audio with said directional information that defines a range of directions from which the audio should be perceived greater than a threshold range of directions.

In one or more examples, the secondary audio importance information is based on one or more of:
audio analysis of the user audio content; and
a determined current location of the user.

In one or more examples, the means are configured to, on determination that the secondary audio importance information associated with said captured user audio content is indicative of the user audio content being unimportant, modify the captured user audio content from being categorised as primary audio and secondary audio to one of monophonic and stereophonic audio prior to said sending of the captured user audio content or capture the user audio content as one of monophonic and stereophonic.

In one or more examples, said means are configured to send user-monitoring information to the remote user device, the user-monitoring information indicative of whether or not the secondary audio is being presented for at least notifying said remote user.

In one or more examples, said means are configured to send user-monitoring information to the remote user device, the user-monitoring information indicative of one or more of:
a presentation direction comprising a direction defined relative to a reference direction comprising from where the audio content is to be perceived when the apparatus is in use, the presentation position for use in presenting the audio content to the remote user by the remote user device;
audio of at least one of the one or more audio sources presented to the user as defined in the current audio presentation information for presenting to the remote user by the remote user device; and
a reference to at least one of the one or more audio sources presented to the user as defined in the current audio presentation information from which the audio can be retrieved for presenting said audio of the at least one of the one or more audio sources to the remote user by the remote user device.

In one or more examples, said means are configured to:
receive remote-user-monitoring information from the remote user device, and one or more of:
provide for presentation of the user audio content to be perceived as originating from a position corresponding to a presentation position, wherein the remote-user-monitoring information from the remote user device comprises the presentation position which is indicative of a position relative to the remote user from where the user audio content is to be perceived when presented by the remote user device; and
provide for presentation of the audio of at least one of one or more audio sources currently being presented to the remote user, wherein said remote-user-monitoring information received from the remote user device comprises said audio or a reference to the at least one of the one or more audio sources presented to the remote user.

In a further aspect there is provided a method, the method comprising:
receiving audio content from a remote user device, the audio content comprising primary audio and secondary audio, the secondary audio being different to the primary audio and comprising ambient audio;
receiving secondary audio importance information associated with said audio content and indicative of an importance of the secondary audio;
receiving current audio presentation information indicative of at least whether audio from one or more audio sources is currently being presented as spatial audio such that respective audio of the one or more audio sources is to be perceived as originating from one or more respective directions or ranges of directions around a reference point;

providing for presentation of the primary audio; and
providing for presentation of the secondary audio based on the secondary audio importance information and the current audio presentation information.

In a further aspect there is provided a computer readable medium comprising computer program code stored thereon, the computer readable medium and computer program code being configured to, when run on at least one processor, perform the method of:
receiving audio content from a remote user device, the audio content comprising primary audio and secondary audio, the secondary audio being different to the primary audio and comprising ambient audio;
receiving secondary audio importance information associated with said audio content and indicative of an importance of the secondary audio;
receiving current audio presentation information indicative of at least whether audio from one or more audio sources is currently being presented as spatial audio such that respective audio of the one or more audio sources is to be perceived as originating from one or more respective directions or ranges of directions around a reference point;
providing for presentation of the primary audio; and
providing for presentation of the secondary audio based on the secondary audio importance information and the current audio presentation information.

In a further aspect there is provided an apparatus, the apparatus comprising means configured to:
send user audio content, captured by a local user device, to a remote user device for presentation to a remote user, said user audio content comprising primary audio and secondary audio, the secondary audio being different to the primary audio and comprising ambient audio; and
send secondary audio importance information associated with said user audio content and indicative of an importance of the secondary audio.

In one or more examples, said user audio content comprising audio of at least a user of the local user device.

In a further aspect there is provided a method, the method comprising:
sending user audio content, captured by a local user device, to a remote user device for presentation to a remote user, said user audio content comprising primary audio and secondary audio, the secondary audio being different to the primary audio and comprising ambient audio; and
sending secondary audio importance information associated with said user audio content and indicative of an importance of the secondary audio.

In a further aspect there is provided a computer readable medium comprising computer program code stored thereon, the computer readable medium and computer program code being configured to, when run on at least one processor, perform the method of:
sending user audio content, captured by a local user device, to a remote user device for presentation to a remote user, said user audio content comprising primary audio and secondary audio, the secondary audio being different to the primary audio and comprising ambient audio; and
sending secondary audio importance information associated with said user audio content and indicative of an importance of the secondary audio.

In a further example aspect there is provided an apparatus comprising:
at least one processor; and
at least one memory including computer program code,
the at least one memory and the computer program code configured to, with the at least one processor, cause the apparatus to perform at least the following:
receive audio content from a remote user device, the audio content comprising primary audio and secondary audio, the secondary audio being different to the primary audio and comprising ambient audio;
receive secondary audio importance information associated with said audio content and indicative of an importance of the secondary audio;
receive current audio presentation information indicative of at least whether audio from one or more audio sources is currently being presented as spatial audio such that respective audio of the one or more audio sources is to be perceived as originating from one or more respective directions or ranges of directions around a reference point;
provide for presentation of the primary audio; and
provide for presentation of the secondary audio based on the secondary audio importance information and the current audio presentation information.

In a further example aspect there is provided an apparatus comprising:
at least one processor; and
at least one memory including computer program code,
the at least one memory and the computer program code configured to, with the at least one processor, cause the apparatus to perform at least the following:
send user audio content, captured by a local user device, to a remote user device for presentation to a remote user, said user audio content comprising primary audio and secondary audio, the secondary audio being different to the primary audio and comprising ambient audio; and
send secondary audio importance information associated with said user audio content and indicative of an importance of the secondary audio.

The present disclosure includes one or more corresponding aspects, examples or features in isolation or in various combinations whether or not specifically stated (including claimed) in that combination or in isolation. Corresponding means and corresponding functional units (e.g., function enabler, speaker selector, amplifier, display device) for performing one or more of the discussed functions are also within the present disclosure.

Corresponding computer programs for implementing one or more of the methods disclosed are also within the present disclosure and encompassed by one or more of the described examples.

The above summary is intended to be merely exemplary and non-limiting.

BRIEF DESCRIPTION OF THE FIGURES

A description is now given, by way of example only, with reference to the accompanying drawings, in which.

DESCRIPTION OF EXAMPLE ASPECTS

Figure 1:
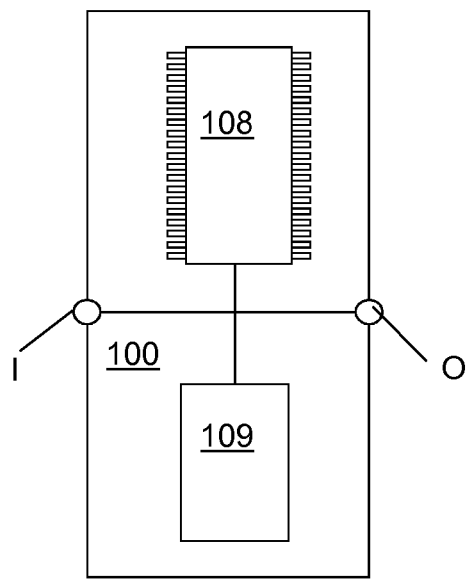
FIG. 1 illustrates an example apparatus for providing for presentation of audio.

Telecommunication or telephony systems are being developed that provide for more than monophonic capture and monophonic presentation of audio. Immersive telephony systems are being developed, such as by the 3rd Generation Partnership Project (3GPP), that will enable a new level of immersion in telephony services. Immersive telephony may comprise the use of spatial audio presentation techniques and the capture of spatial audio content in the provision of telecommunication between users. Such service can be realized, e.g., over a mobile 4G or 5G network by a multi-microphone spatial audio capture and processing, encoding in a suitable immersive audio format, transmission and decoding, and binaural or loudspeaker presentation. Such systems may provide for transmission of and presentation of immersive, spatial audio content, such as parametric spatial audio. This may enable receiving and sending of an enveloping audio scene from/to the telecommunication call participants or users. Thus, for example, when a remote user calls to a user, the user can experience the audio environment around the remote user as if he/she was physically located at the location of the remote user and vice versa.

In one or more examples however, the user may already be experiencing immersive spatial audio content from one or more audio sources. Accordingly, it may require careful consideration to provide for presentation of immersive audio telecommunication content in combination with a pre-existing spatial audio scene comprising audio from one or more audio sources presented as spatial audio such that said audio is to be perceived from one or more respective directions. For example, complications relating to auditory masking in time, frequency and/or spatial accuracy may occur for at least one of the one or more audio sources during a simultaneous presentation.

In one or more examples, the audio content provided as part of said telecommunication may be categorised as primary audio and secondary audio. The primary audio may comprise the important audio for understanding the telecommunication call while the secondary audio may comprise ambient audio. Ambient audio may be considered the background audio of the audio content. It will be appreciated that while the examples herein relate to audio content in the field of telecommunication, the principles may be applied to other fields of audio content presentation.

In one or more examples, the primary audio may comprise voice audio comprising audio determined to be generated by a voice of one or more remote users in telecommunication with a user (who may be referred to as a local user). The "voice" primary audio may be categorised at the point of capture or at the point of play back using audio analysis techniques, or by a server or any other entity involved in said telecommunication. The secondary audio may, in one or more examples, comprise ambient audio comprising audio other than that determined to be generated by the voice of one or more remote users. Thus, in one or more examples, a first microphone configured to detect the user's voice may provide the primary audio and one or more other microphones configured to detect audio from elsewhere may provide the secondary audio. It will be appreciated that with multi-microphone arrangements the same audio may be detected by more than one microphone and therefore audio processing techniques may be used to separate the voice audio detected primarily by the first microphone from the audio detected by the other microphones. For example, if a mobile telephone is used to capture the audio, a microphone near the user's mouth may be configured to capture, primarily, the voice audio and a microphone(s) on the back of the mobile telephone may be configured to capture the ambient audio. In one or more examples, a single microphone may be used and audio processing algorithms may be used to separate the voice audio from any ambient noise to provide for audio content categorized as primary audio and secondary audio, wherein such algorithms are known to those skilled in the art. In further examples, the voice audio may be captured using a close-up microphone or microphones, while the ambience may be captured using a microphone array (such as an Ambisonics microphone) which may have a fixed position in the scene.

In one or more examples, the primary audio may comprise spatial audio content that includes directional information such that, when presented, it is to be perceived as originating from one or more directions in accordance with the directional information. In one or more examples, the primary audio may not include directional information. In one or more examples, the secondary audio may comprise ambient audio comprising audio without said directional information or without a direction of arrival distinguishable above a threshold level. In one or more examples, the ambient audio comprises spatial audio, but may not have clear directions (e.g. above the threshold level of directionality) that the user can perceive or that can be determined from the audio that was captured. Thus, in one or more examples, the secondary audio may include at least some directional information too. However, the transmitting end, or any other element, may consider these directional sound components to not provide information that is particularly relevant or perceptually important for the communication. Thus, in one or more examples, a classification or content analysis may be performed to determine which audio should be classified as primary and which as secondary and, optionally, whether or not directional information should be associated with the audio.

It will be appreciated that in one or more examples, the primary audio may be important for understanding a telecommunication call while the secondary, ambient, audio, may be considered to be the background audio at the location of the remote user and therefore only "possibly" important to the telecommunication call. The secondary audio, by default, may be configured for presentation such that it is heard from a wide range or all directions or such that it is to be perceived from no specific direction or location. Thus, the secondary audio may be configured, by default, to be provided for replicating the ambient audio environment of the remote user to the user or vice versa. If the audio content is an audiobook, the primary audio may comprise the reader of the audiobook, while the secondary audio may comprise background sounds provided to supplement the story. In one or more examples, the secondary audio may be selectively presented, or its presentation may be modified from its default presentation based on one or both of its importance and audio that is already being presented to the user on receipt of the telecommunication call.

With primary audio that comprises spatial audio content, the direction from which audio was received at the location of the remote user may be reproduced when presenting the audio to the first user (or any other user) by use of spatial audio presentation. In one or more examples, the primary audio may be converted to monophonic audio (such as from spatial audio content) and presented using spatial audio presentation such that it is perceived from a desired direction or location.

Spatial audio comprises audio presented in such a way to a user that it is perceived to originate from a particular location or direction, as if the source of the audio was located at that particular location or direction. Spatial audio content comprises audio for presentation as spatial audio and, as such, typically comprises audio having directional information (either explicitly specified as, for example, metadata or inherently present in the way the audio is captured), such that the spatial audio content can be presented such that its component audio is perceived to originate from one or more points or one or more directions in accordance with the directional information. One way to encode and deliver spatial audio for an immersive audio telecommunication call is to encode the user's voice and the spatial ambience separately. Various encoding formats exist including, e.g., near-far stereo, First Order Ambisonics (FOA)/Higher Order Ambisonics (HOA)(+objects), and other spatial audio encoding schemes. The provision of the primary and secondary audio, in one or more examples, may be provided by the above-mentioned encoding schemes.

In one or more examples, non-spatial audio content may be presented as spatial audio. Thus, "conventional" monophonic or stereophonic audio (or audio converted to such a format) may be provided for presentation such that it will be perceived to originate from a particular location or direction. One or more of the embodiments described herein may present spatial audio based on spatial audio content or non-spatial audio content.

The spatial positioning of the spatial audio may be provided by 3D audio effects, such as those that utilise a head related transfer function to create a spatial audio space (aligned with a real-world space in the case of augmented reality) in which audio can be positioned for presentation to a user. Spatial audio may be presented by headphones by using head-related-transfer-function (HRTF) filtering techniques or, for loudspeakers, by using vector-base-amplitude panning techniques to position the perceived aural origin of the audio content. In other embodiments ambisonics audio presentation may be used to present spatial audio.

Spatial audio may use one or more of volume differences, timing differences and pitch differences between audible presentation to each of a user's ears to create the perception that the origin of the audio is at a particular location or in a particular direction in space. The perceived distance to the perceived origin of the audio may be rendered by controlling the amount of reverberation and gain to indicate closeness or distance from the perceived source of the spatial audio. It will be appreciated that spatial audio presentation as described herein may relate to the presentation of audio with only a perceived direction towards its origin as well as the presentation of audio such that the origin of the audio has a perceived location, e.g. including a perception of distance from the user.

Figure 2:
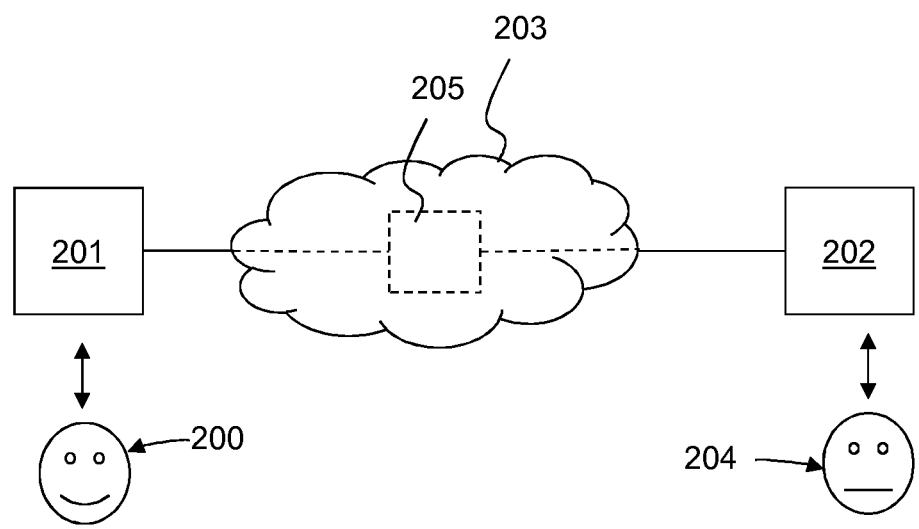
FIG. 2 illustrates telecommunication between a user and a remote user.

Example FIG. 1 and example FIG. 2 shows an apparatus 100 that may be used to control or provide for the presentation of audio content to a user 200. The apparatus 100 may have application in the field of telecommunication and therefore in the examples that follow, the audio content is referred to as telecommunication audio content. However, it will be appreciated that the audio content need not be for telecommunication. It will also be appreciated that reference to telecommunication audio content infers no limitation on how the audio content is delivered and may be via traditional telephone networks, mobile or cell phone based networks, data networks such as the Internet using voice over IP or any telephony service whether packet based or circuit switched. The apparatus 100 may include means to receive telecommunication audio content or information about the receipt of telecommunication audio content by another apparatus, such as an input I. It will be appreciated that the apparatus 100 may include further inputs, such as to receive audio from other audio sources for presentation to the user 200 or information about other audio that is presented by another apparatus to the user 200. The input I may receive audio, such as immersive audio comprising primary and secondary audio, from a remote user device 202 (shown in FIG. 2). In one or more examples, the apparatus 100 may comprise part of a local user device 201 which may have the capability to provide for telecommunication with the remote user device 202, via a telecommunication network 203. The local user device 201 and/or remote user device 202 may comprise mobile telephones or any other telecommunication equipment. Thus, the first user 200 may be able to communicate with a remote user 204 associated with the remote user device 202.

While the description that follows primarily describes the apparatus 100 as part of the local user device 201, it will be appreciated that a corresponding remote apparatus (not shown but equivalent to apparatus 100) may be provided as part of the remote user device 202 and may perform equivalent functions on audio and information received from the party who is remote thereto.

The apparatus 100 may comprise or be connected to a processor 108 and a memory 109 and may be configured to execute computer program code. The apparatus 100 may have only one processor 108 and one memory 109 but it will be appreciated that other embodiments may utilise more than one processor and/or more than one memory (e.g. same or different processor/memory types). Further, the apparatus 100 may be an Application Specific Integrated Circuit (ASIC).

The processor may be a general-purpose processor dedicated to executing/processing information received from other components, such as telecommunication audio content in accordance with instructions stored in the form of computer program code in the memory. The output signalling generated by such operations of the processor is provided onwards to further components, such as to speakers, headphones, an amplifier or other audio presentation equipment (not shown) to present audio to the user 200.

The memory 109 (not necessarily a single memory unit) is a computer readable medium (solid state memory in this example, but may be other types of memory such as a hard drive, ROM, RAM, Flash or the like) that stores computer program code. This computer program code stores instructions that are executable by the processor, when the program code is run on the processor. The internal connections between the memory and the processor can be understood, in one or more example embodiments, to provide an active coupling between the processor and the memory to allow the processor to access the computer program code stored on the memory.

In this example, the respective processors and memories are electrically connected to one another internally to allow for electrical communication between the respective components. In this example, the components are all located proximate to one another so as to be formed together as an ASIC, in other words, so as to be integrated together as a single chip/circuit that can be installed into an electronic device. In some examples one or more or all of the components may be located separately from one another.

Thus, the user 200 may be presented with audio from one or more audio sources (not shown), such as music from a music player, audio from a work presentation provided on a laptop computer and audio alerting the user to the arrival of emails or messages, also from the laptop computer. The apparatus 100 may provide for presentation of the aforementioned audio from the audio sources or may control the presentation of the audio from the audio sources or may receive information about what audio from the audio sources is being presented to the user 200 from audio presentation equipment. The apparatus 100 may provide for presentation of the telecommunication audio content or control the presentation of the telecommunication audio content in combination with the audio from the one or more audio sources. In one or more examples, the apparatus 100 may provide a user interface for control of the presentation of the aforementioned audio and audio content from telecommunication.

Figure 3:
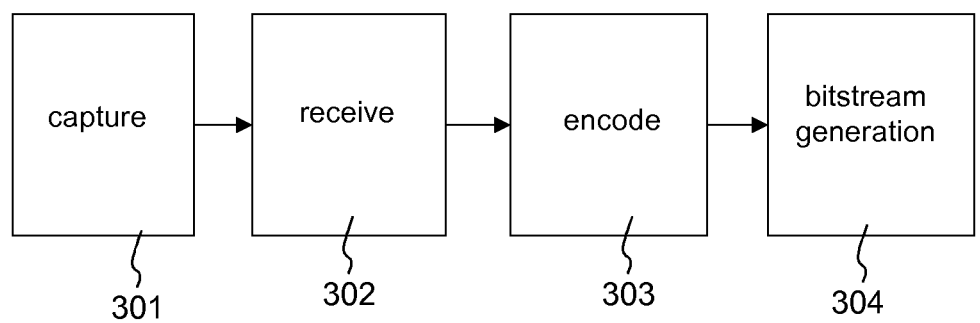
FIG. 3 illustrates an example block diagram of an immersive spatial audio encoder.

FIG. 3 shows an example block diagram of the capture and encoding of immersive audio content by an immersive audio encoder. Block 301 illustrates the capture of audio by one or more microphones from one or more sources, such as from a mobile telephone, immersive video capture device, a computer or a smartphone. Block 302 illustrates the receiving of audio that may be captured in various formats, such as monophonically, as ambisonics audio, as multiple channels or streams, wherein said audio may, in one or more examples, be associated with metadata that may define at least the direction of arrival of the audio from the source or location of the source of audio. An encoder block 303 receives the audio captured in its various formats. The encoder block 303 may provide for audio mixing. The metadata associated with the audio may be captured in a plurality of different formats. In one or more examples the block 303 may translate the metadata into a standard format. In one or more examples, the audio itself may be captured and encoded in different formats and the block 303 may transcode the audio to a standard format or formats. Block 304 provides for generation of a bitstream in an immersive audio encoded format. In one or more examples, the audio content referred to herein may be processed as described above.

Figure 4:
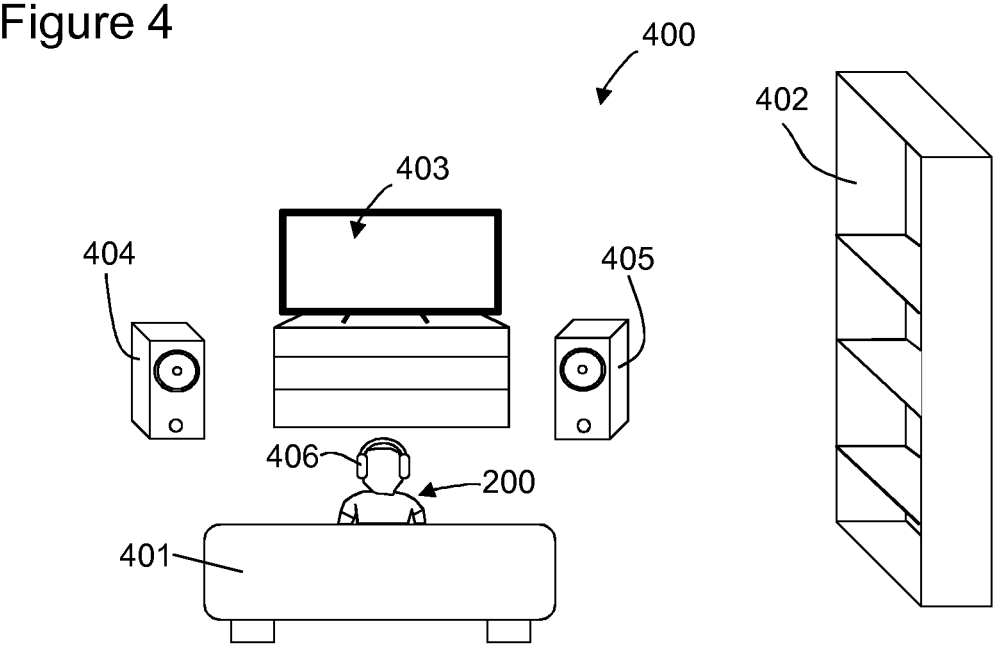
FIG. 4 illustrates an example presentation space in which a user is presented with audio.

Example FIG. 4 shows the user 200 in an audio presentation space 400 comprising their living room. The living room 400 comprises a sofa 401, bookcase 402, big screen TV 403 and speakers 404, 405. The user 200 may be experiencing audio content presented in an immersive way, such as spatial audio presentation. The audio content may be from one or more audio sources. The audio sources may provide audio in various formats, such as spatial audio, monophonic or stereophonic audio. Audio presentation equipment (not shown, although headphones 406 may comprise part) may present the audio as spatial audio from the one or more sources or the audio sources may be in communication to coordinate how, or from which perceived location, each of them presents their audio relative to a reference point. The reference point is typically the location of the user. Accordingly, in one or more examples, audio of the one or more audio sources is to be perceived as originating from one or more respective directions or ranges of directions around the user.

The proliferation of high-quality spatial audio services, applications and devices capable of rendering the spatial audio content (e.g. head-tracked binaural audio) will likely lead to significant increase in their use. And vice versa, increased interest in immersive media will lead to more and more offerings in the market. With increased use, it is likely that the user 200 will be consuming spatial audio content (or monophonic or stereophonic content presented as spatial audio) when the remote user 204 places a telecommunication call to them. Further, it is likely the user 200 will wish to multitask and thus utilize the capabilities of spatial audio presentation in new and creative ways.

In this and one or more examples, the user 200 may be experiencing immersive, spatial audio as described below. The user 200 may be working on a computer using the living-room big screen TV 403 and may be presented with spatial audio via head-tracked headphones 406. The headphones 406 may be provided with a microphone (not visible) to enable user participation in a telecommunication call with the remote user 204, if such a telecommunication call is established. It will be appreciated that the microphone may be independent of the headphones 406. The user 200 may have decided to receive audio related to what they are working on, to receive audio associated with the arrival of social media updates (from a social media application audio source), music (from a music player audio source) and telecommunication audio content (from a telecommunication device should a call be received or placed by the user). It will be appreciated that the user 200 may not have to make a decision on where the audio of the audio sources is to be perceived and instead the arrangement may be based on predefined preferences or rules or where there is no overlap with other audio sources. In some examples, the user can define at least some of the perceived directions or locations from which they perceive the audio via a user interface used to control at least some aspects of the spatial audio rendering and presentation. In one or more examples, the direction or location from which the user perceives the audio may be defined relative to the room or space in which the user is located. Accordingly, as the user rotates their head or moves around the room, the rendering of the audio may be modified to account for their new orientation or position in the room to maintain the perceived directions/locations in a fixed perceived direction/location.

Figure 5:
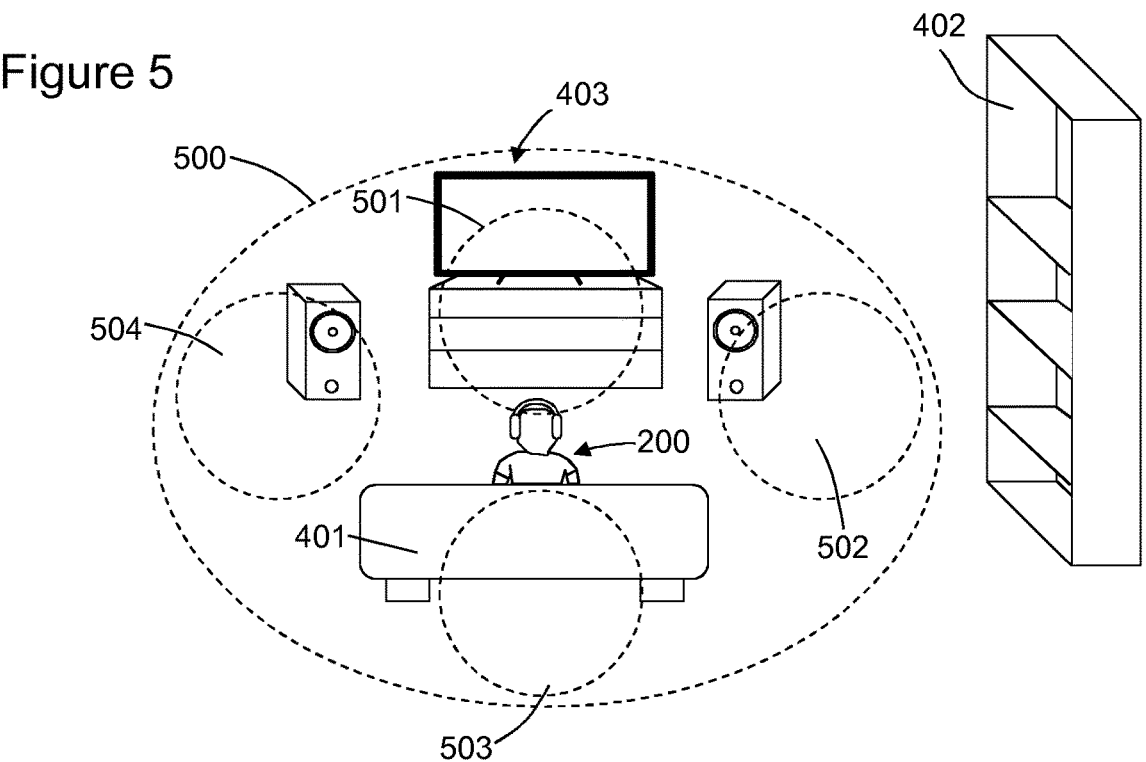
FIG. 5 illustrates the same presentation space but overlaid with an example spatial audio scene showing where audio is perceived to originate that is provided to the user under the control of the apparatus.
Figure 6:
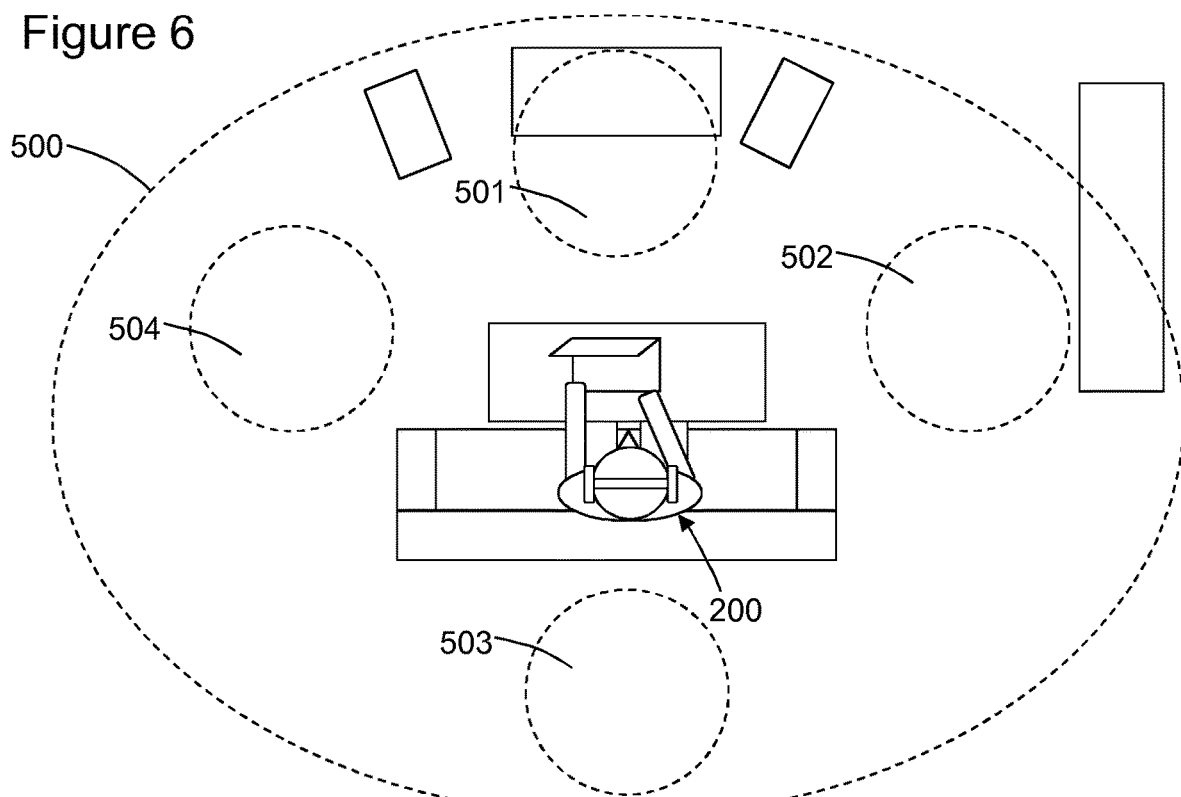
FIG. 6 illustrates a plan view of FIG. 5.

FIGS. 5 and 6 illustrates how the user may have arranged a spatial audio scene 500 which defines where in space they perceive the audio from the various audio sources. As mentioned previously, the spatial audio scene may be created automatically with or without user control. FIG. 5 shows the same view as FIG. 4 and FIG. 6 shows a plan view of the same audio presentation space 400.

The user 200 has placed their work-related audio such that, when presented, it will be perceived to originate from a forward position 501. The spatial audio scene 500 is further configured such that the music, when presented, will be perceived to originate from a front right position 502. The spatial audio scene 500 is further configured such that the audio of social media updates will be perceived to originate from a rearward position 503. The spatial audio scene 500 is further configured such that the audio of any incoming telecommunication audio content will be presented such that it will be perceived to originate from a front left position 504. Thus, a spatial audio scene may be created in which audio from one or more audio sources is presented as spatial audio, by headphones 406 or speakers 404, 405 or a combination thereof for example, to the user 200 such that the audio from each audio source is perceived from a different direction or location relative to the user 200. Accordingly, it can be understood that the perceived origin of audio of the audio sources has been virtually positioned around the user 200.

When an incoming immersive audio telecommunication call is received, a default configuration of the spatial audio scene 500 not forming part of the invention may be to replace the spatial audio presentation of the audio of the audio sources with the incoming telecommunication audio. However, this may be annoying or inconvenient for the user 200 who is currently multitasking and has even set up a preferred arrangement of the audio sources in the spatial audio scene 500.

As will be described below, how telecommunication audio content is presented in terms of presentation within the existing spatial audio scene 500 or replacing or modifying the presentation of other audio in the spatial audio scene 500 of the user 200 may be based on information received by the apparatus 100. Accordingly, the apparatus 100 may receive information about the importance of the secondary audio of the telecommunication audio content. Further, the apparatus 100 may receive information about the audio that is presented in the existing spatial audio scene 500 (if any).

Thus, in one or more examples, the apparatus 100 may comprise means configured to provide for presentation of incoming telecommunication audio content based at least in part on:

receipt of said audio content;
receipt of secondary audio importance information; and
receipt of current audio presentation information.

The apparatus 100 may receive telecommunication audio content which may be from the remote user device 202 for presentation to the user 200, such as via their local user device 201. The telecommunication audio content may comprise the voice of the remote user 204 and ambient audio of the audible at the location of the remote user 204. The telecommunication audio content may thus be categorised as primary audio and secondary audio, as described above.

Accordingly, in one or more examples, the primary audio may be defined as comprising voice audio. Thus, the primary audio may comprise audio determined to be generated by a voice of the remote user 204 who is in telecommunication with the user 200. The secondary audio may be defined as comprising ambient audio. The ambient audio may thus comprise audio other than that determined to be generated by the voice of the remote user 204.

In one or more other examples, the primary audio may be defined as comprising spatial audio content that includes directional information such that, when presented to the user 200, it is perceived as originating from a particular direction or range of directions in accordance with the directional information. In these one or more examples, it may be desirable to separate audio that is to be perceived from a more specific direction or range of directions from more diffuse audio that is to be perceived from a less specific direction or range of directions. In some examples, this may be achieved based on whether or not directional information is associated with the audio and thus audio with directional information is categorised as primary audio and audio without directional information is categorised as secondary audio, as it deemed to make up the audio ambience. In other examples, it may be desirable to categorise, as secondary audio, audio that has associated directional information but said associated directional information indicates it should be presented such that it is perceived from a wide range of directions above a threshold range of directions. Accordingly, the threshold range may comprise 180° and therefore if the audio has directional information indicative that it should be presented with a perceived direction of origin less than 180° it is deemed primary audio and if the audio has directional information indicative of a perceived direction equal to or greater than 180° it is deemed secondary audio. It will be appreciated that the threshold may comprise any desired threshold to separate primary audio from secondary audio.

The secondary audio importance information, in one or more examples, is associated with said telecommunication audio content and indicative of an importance of the secondary audio thereof. The importance may be a perceived importance set by the remote user 204. For examples, the remote user 204 may make the telecommunication call from their noisy office and deem the secondary, ambient, audio to be unimportant. In other examples, the remote user 204 may be at a music concert and may want the user 200 to hear their audio experience. Thus, the remote user 204 may deem the secondary audio to be important and may indicate this to their remote apparatus or remote user device 202 for it to provide the secondary audio importance information for receipt by the apparatus 100. In one or more examples, the remote user 204 considering the ambient audio as unimportant may place the call using a 'voice call' application shortcut. In another example, the remote user 204 considering the ambient audio as important may place the call using an 'immersive call' application shortcut. In other words, for example the application icon on a smartphone user interface of the remote user device 202 may be different for the two cases of relative importance for the secondary, ambient, audio. Any other suitable way of indicating the importance of the ambience or secondary audio can also be used for the user to make their selection. It is understood a 'voice call' here may refer to a telecommunication call where the secondary audio content may or may not be present in the transmitted bitstream in a time-varying manner (for example based on the audio importance information and other bit-rate determining factors such as network congestion), while an 'immersive call' here refers to a telecommunication call where the secondary audio content is preferably available for presentation throughout the call.

In some examples, the remote apparatus or remote user device 202 for example may analyse the expected or contextual importance of the current environment either based on sensory data collected by the remote apparatus or remote user device 202, received for example from the cloud or nearby terminals, or a combination thereof. The remote apparatus or remote user device 202 may be configured to, based on this information, adapt the user interface such that for example the 'immersive call' application is shown first or otherwise offered as the preferred option for the user when the current environment or context is considered important for providing the secondary audio or ambience. On the other hand, when the secondary audio or ambience would be considered unimportant by the analysis, the 'voice call' shortcut may be shown first or otherwise offered as the preferred or default option for the user. In at least some examples, the network may provide further information for the device for making this adaptation. For example, the network may indicate that the network is congested (and 'voice call' should be preferred because an immersive call requires more bandwidth) or that there is a special pricing for an 'immersive call' in the current cell or at the current time. According to the various examples, the remote user 204 may thusly select the importance of the "ambience" or the secondary audio via at least one means.

Thus, in one or more examples, said secondary audio importance information is received from the remote user device 202 with said telecommunication audio content, which may be captured by the remote user device 202. In one or more examples, the secondary audio importance information is set on a per telecommunication call basis. Thus, for each telecommunication call established, the remote user 204 may set the secondary audio importance information for sending to the apparatus 100. In one or more other examples, the setting of the secondary audio importance information may be automated based on predetermined criteria or based on automated audio analysis. For example, if the remote user 204 is at a location they frequent often, the secondary audio may be automatically set to being unimportant. However, if the remote user 204 is at an unusual location such as a safari park, the secondary audio may be automatically set to being important for communicating as the secondary audio importance information. In one or more examples, said secondary audio importance information is determined by and received from a server 205 (shown in FIG. 2 as part of network 203) that receives said telecommunication audio content from the remote user device 202 and may forward it to the local user device 201 to provide said telecommunication.

In one or more examples, the current audio presentation information is indicative of at least whether or not audio from one or more audio sources is currently being presented to the user as spatial audio. Accordingly, the current audio presentation information may provide the apparatus 100 with information about the existing spatial audio scene 500. This information may be whether or not any audio sources are currently being presented or it may comprise details of the locations used for the spatial audio presentation of the audio of the audio sources. In one or more examples, the apparatus 100 may be configured to present the audio of the audio sources and therefore the current audio presentation information may be known to the apparatus 100.

The presentation of incoming telecommunication audio content may comprise providing for presentation of the primary audio of the telecommunication audio content and providing for presentation of the secondary audio based on the secondary audio importance information and the current audio presentation information. Thus, the primary audio may be presented independent of, i.e. without consideration of, the secondary audio importance information. The apparatus 100 may be configured to provide for presentation of the primary audio based on the current audio presentation information. However, the apparatus 100 may be configured to determine whether or not to and/or how (i.e. to be perceived from which direction) to present the secondary audio based on both the secondary audio importance information and the current audio presentation information.

In one or more examples, the apparatus 100 is configured to provide for presentation of the primary audio as spatial audio such that it is perceived to originate from a direction or range of directions. In one or more examples, said "range of directions" comprises one or both of (1) a "width" or "spatial extent" of a direction/location of the perceived origin of audio (i.e., the audio is not perceived as originating from a point-source) and (2) an area/sector where the audio is perceived from a point-source that is configured to move over said range of directions over time. From which direction the primary audio is perceived may be determined based on the current audio presentation information. For example, if the user 200 has designated a position or region 504 from which to perceive telecommunication audio, then the apparatus 100 may be configured to present the primary audio of the telecommunication audio as spatial audio such that it is perceived from said predetermined position 504. In one or more other examples, where a predetermined position 504 for telecommunication audio has not been predetermined, then the apparatus 100 may be configured to identify a position that is non-overlapping with a direction or range of directions, i.e. the directions from positions 501, 502 and 503 towards the user 200 for example, associated with the audio of the one or more audio sources based on the current audio presentation information. Thus, the apparatus 100 may be configured to identify an unused position in the existing spatial audio scene 500 to use when presenting the primary audio as spatial audio to be perceived from said unused position. In one or more other examples, the current audio presentation information may be indicative of no audio currently being presented and the apparatus 100 may be configured to present the primary audio of the telecommunication audio content as spatial audio from a perceived position in front of the user 200 or in accordance with any other arrangement defined by the directional information accompanying the spatial audio content of the telecommunication audio content.

The secondary audio importance information may define at least two levels of importance comprising, for example, important and unimportant. It will be appreciated that more than two levels of importance may be defined.

In one or more examples, the secondary audio importance information may comprise recipient-adaptive information, wherein a remote user or remote user device 202 may be configured to, for example, receive information about the currently presented audio of the local user, and the secondary audio importance information may be based on said received information. Further, the secondary audio importance information may comprise a definition of a proposed replacement of at least one currently presented audio source by the secondary audio content. Upon receiving such proposal, the apparatus 100 may be configured to provide for presentation of a user interface to receive user input from a local user who may at least choose to accept or reject said proposal to modify the current audio presentation.

In general, the apparatus may be configured to determine whether or not to present the secondary audio based on the secondary audio importance information and the current audio presentation information. Further, in one or more examples, the apparatus may be configured to, in the event that the secondary audio should be presented, determine from where the secondary audio, presented as spatial audio, is to be perceived as originating based on current audio presentation information.

The secondary audio, in one or more examples, may be considered to be the ambient audio of the telecommunication call rather than the main content of the telecommunication call.

Accordingly, the apparatus 100 may be configured to, based on the secondary audio importance information being indicative of the secondary audio being important (or of greater importance than another "importance" designation of the secondary audio importance information), provide for presentation of the secondary audio, said presentation based on the current audio presentation information. Thus, based on the secondary audio being considered or designated as important or desirable for presentation, the apparatus 100 may deem it obligated to present it. The apparatus 100 may then consider the way in which it is presented based on the current audio presentation information. For example, from which direction the secondary audio is heard may be determined based on the current audio presentation information. If the user has designated a position or region 504 from which to perceive telecommunication audio, then the apparatus 100 may be configured to present the secondary audio of the telecommunication audio as spatial audio such that it is perceived from said predetermined position 504. In one or more other examples, where a predetermined position 504 for telecommunication audio has not been predetermined, then the apparatus 100 may be configured to identify a position that is non-overlapping with a direction or range of directions, i.e. the directions from positions 501, 502 and 503 towards the user 200 for example, associated with the audio of the one or more audio sources based on the current audio presentation information. In one or more examples, the secondary audio may be presented as monophonic audio, and may therefore be presented without a perceived origin location or direction. In one or more other examples, in which the current audio presentation information is indicative of no audio currently being presented, the apparatus 100 may be configured to present the secondary audio of the telecommunication audio content as spatial audio from perceived position(s) or directions all around the user 200 in accordance with a spatial arrangement defined by the directional information accompanying the secondary audio of the telecommunication audio content.

In one or more examples, in which the secondary audio importance information is indicative of the secondary audio being important and the current audio presentation information being indicative of at least one of the one or more audio sources currently presenting audio to the user 200, the apparatus 100 may be configured to provide for presentation of the secondary audio and provide for modification of one or both of a volume or the range of directions with which the audio of at least one of the one or more audio sources is presented to accommodate presentation of the secondary audio. Thus, the volume with which the audio presented from perceived positions 501, 502, 503 may be reduced. In one or more examples, the size of the perceived positions 501, 502, 503 may be reduced such that the audio of each audio source is perceived from a narrower range of directions. In one or more examples, the position of the perceived positions 501, 502, 503 may be moved such that there is a greater amount of space in the existing spatial audio scene 500 for presentation of the secondary audio. It will be appreciated that the degree to which modification of one or more of the volume, perceived position of the audio source audio and perceived size of the position 501, 502, 503 is provided may be based on predetermined criteria and/or content of the secondary audio. For example, if the secondary audio comprises spatial audio content, then the directional information may indicate a range of directions over which the secondary audio should be presented to replicate the audio experience of the remote user 204. Accordingly, the apparatus 100 may be configured to modify the existing spatial audio scene using this range of directions.

In one or more examples, in which the secondary audio importance information is indicative of the secondary audio being unimportant, the apparatus 100 may be configured to not present the secondary audio at all. In one or more other examples, the apparatus 100 may be configured to provide for non-presentation of the secondary audio based on the current audio presentation information being indicative that at least one of the one or more audio sources are currently presenting audio to the user 200. Thus, if other audio sources are being presented it may be overly confusing for the non-important secondary audio to be presented as well and, accordingly, it may be ignored. In one or more examples, the designation of the secondary audio as unimportant may provide for non-sending of the secondary audio by the remote user device 202. Thus, the apparatus 100 may receive telecommunication audio content absent of secondary audio and comprising only primary audio.

In one or more other examples in which the secondary audio importance information is indicative of the secondary audio being unimportant, the apparatus 100 may be configured to provide for presentation of the secondary audio only when the current audio presentation information is indicative that none of the one or more audio sources are currently presenting audio to the user 200. Thus, if there is no current existing spatial audio scene 500, then the secondary audio may be presented regardless of it being deemed unimportant in the secondary audio importance information. In one or more examples, where the secondary audio importance information comprises three or more levels, a lowermost level of importance may always provide for non-presentation of the secondary audio while a higher but not highest level of importance may provide for presentation of the secondary audio only in limited circumstances based on the current audio presentation information, such as when the current audio presentation information is indicative that none of the one or more audio sources are currently presenting audio to the user 200.

In one or more examples, the apparatus 100 may receive default perceived location information which defines a default perceived location for the audio content. Thus, the apparatus may provide for setting of a position, such as the position 504, as a default perceived location for the presentation of telecommunication audio content. The setting of said default perceived location may be provided in the current audio presentation information. It will be appreciated that in other examples a separate designation of the default perceived location may be provided independent of the current audio presentation information for use by the apparatus 100 in the presentation of the telecommunication audio content. In one or more examples, the apparatus 100 may be configured such that on receipt of the telecommunication audio content, at least said primary audio of said content is provided for presentation as spatial audio to be perceived as originating from said default perceived location, if said default perceived location is set. In one or more examples, the apparatus 100 may be configured such that on receipt of the telecommunication audio content and if said default perceived location is not set, at least said primary audio of said content is provided for presentation as spatial audio such it is perceived from a direction or range of directions that is non-overlapping with any audio that is presented from the one or more audio sources. Thus the direction is automatically determined to avoid perceived spatial overlap between different audio.

The apparatus 100 may therefore be advantageous because on receipt of the telecommunication audio content comprising primary and secondary audio, such as a proposed immersive audio call, the presentation of the telecommunication audio content may be controlled by the presence of at least the secondary audio importance information. The secondary audio importance information may advantageously provide the remote user 204, the remote user device 202 or the server 205 with a means for signalling to the apparatus 100 regarding how important the secondary audio is and therefore the apparatus 100 may make informed choices about how to render and/or present the incoming telecommunication audio content to the user 200.

Above, the local user device 201 is described as receiving the telecommunication audio content from the remote user device 202. However, as will be appreciated, to provide two-way communication, the local user device 201 may likewise be configured to capture audio content of the user 200 and their surroundings, termed user-telecommunication audio content (or more generally "user audio content" to semantically distinguish it from the audio content described above). Thus, the apparatus 100 may be configured to send said user-telecommunication audio content to the remote user device 202 to provide for telecommunication between the user 200 and the remote user 204 of the remote user device 202. The apparatus may control a telecommunication device or transmitter to provide for the sending of the user-telecommunication audio content. In one or more examples, said user-telecommunication audio content comprises primary audio and secondary audio, similar to the telecommunication audio content.

Further, the apparatus 100 may be configured to provide for generation and sending of secondary audio importance information for use by the remote apparatus of the remote user device 202, for example. As will be appreciated, the secondary audio importance information provided by the apparatus 100 may be associated with said user-telecommunication audio content and indicative of an importance of the secondary audio of the user-telecommunication audio content.

The secondary audio importance information associated with the user-telecommunication audio content sent to the remote user device 202 may be based on user input received from the user 200. Thus, in one or more examples, the user 200 may indicate, through a user input, when initiating and/or during a telecommunication call the importance of their secondary audio. In one or more other examples, the secondary audio importance information associated with the user-telecommunication audio content may be automatically determined by audio analysis performed by the apparatus 100, the local user device 201 or the server 205. The user 200 may or may not be required to confirm the automatic determination of the secondary audio importance information and thus the apparatus 100 may or may not be configured to receive confirmatory user input. In one or more other examples, the secondary audio importance information associated with the user-telecommunication audio content may be automatically determined based on a current location of the user 200. For example, the current location of the user 200 may be compared to map data or historic locations at which the user 200 (or many other users) has been present to determine whether or not the current location is unusual or noteworthy and therefore the potential importance of the secondary audio.

As described above, when the secondary audio importance information is indicative of the secondary audio being unimportant, the apparatus 100 may be configured to not present it or present it as spatial audio from a particular location or without spatial audio presentation. Accordingly, the secondary audio may be provided over the network 203 but then ultimately unused. Thus, in one or more examples, the apparatus 100 may provide for modification of the user-telecommunication audio content to modify the secondary audio or remove the secondary audio prior to sending it to the remote user device 202 based on the secondary audio importance information associated with the user-telecommunication content being indicative of the secondary audio being unimportant. In one or more examples, only the primary audio may be provided for sending with or without associated directional information. In one or more examples, the apparatus 100 may be configured to provide for audio modification of the user-telecommunication audio content from being categorised as primary audio and secondary audio to comprising one of monophonic and stereophonic audio. Thus, if the secondary audio is not important then the relevance of providing an immersive call may be lost and the telecommunication call may be "downgraded" to a monophonic or stereophonic audio call. Such monophonic or stereophonic audio call may at least in some examples include at least some spatial information for the primary audio content which may be the only transmitted audio content during the audio call.

How the secondary audio is presented or if the secondary audio is presented at all may be selected by the apparatus 100 based at least on the secondary audio importance information. In one or more examples, it may be advantageous for the remote user 204 or the remote user device 202 to know the selection made by the apparatus 100. Accordingly, in one or more examples, the apparatus 100 may be configured to provide for sending of user-monitoring information to the remote user device 202, the user-monitoring information indicative of at least whether or not the secondary audio of the telecommunication audio is being presented to the user 200 for at least notifying said remote user 204 or remote user device.

Accordingly, based on the user-monitoring information, the remote apparatus equivalent to the apparatus 100 associated with the remote user device 202 may be configured to provide for informing the remote user 204 of whether or not the secondary audio they are sending to the user 200 is being presented to the user 200.

Likewise, based on user-monitoring information received by the apparatus 100 from the remote user device 202 or remote apparatus, the apparatus 100 may be configured to inform the user 200 whether or not the secondary audio of the user-telecommunication audio content they are sending to the remote user 204 is being presented to the remote user 204.

Informing the relevant users 200, 204 may comprise presentation of a message, such as a textual or pictorial or aural or haptic message.

The user monitoring information may be considered as feedback to the source of the telecommunication audio or user-telecommunication audio to provide information about how it is being presented at its destination.

The user-monitoring information may be indicative about other parameters of the presentation of the (user-)telecommunication audio content.

In one or more examples, the user-monitoring information may be indicative of a presentation position 504 comprising a position relative to the user 200 associated with the presentation of the telecommunication audio content to the user 200 such that the user 200 will perceive the telecommunication audio content to originate from said presentation position 504. Thus, the remote user device 202 or remote apparatus thereof will be informed of where in the presentation space 400 or spatial audio scene 500, the user 200 is currently perceiving the origin of the telecommunication audio content.

The remote user device 202 or remote apparatus may be configured to provide for presentation of the telecommunication audio content to the remote user 202 with an equivalent presentation position 504. Thus, the remote user's self-generated audio, i.e. the telecommunication audio content, will be captured and presented to the remote user 204 such that it is perceived from a front left position equivalent to position 504 relative to the user 200.

Likewise, the apparatus 100 may be configured to receive corresponding user-monitoring information, termed remote-user-monitoring information for clarity, from the remote user device 202 or remote apparatus thereof. Accordingly, based on the remote-user-monitoring information, the apparatus 100 may be configured to provide for presentation of the user-telecommunication audio content to the user 200 from a direction or location relative to the user 200 that corresponds to the presentation position indicated in said remote-user-monitoring information.

Figure 7:
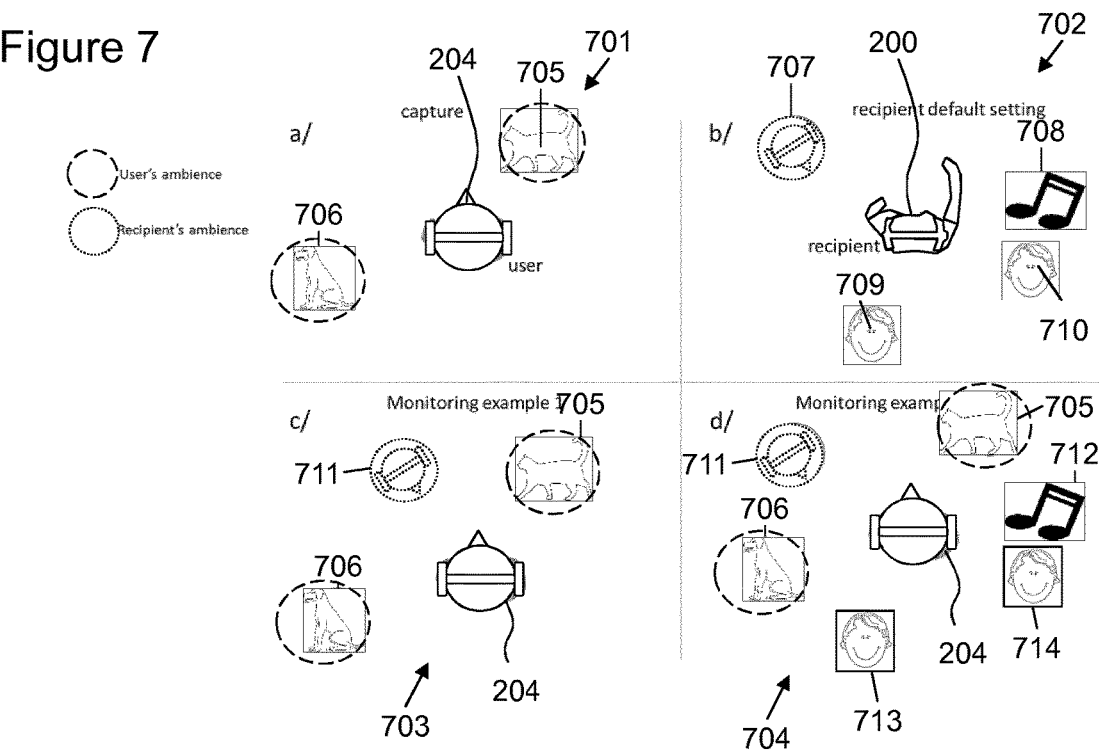
FIG. 7 illustrates the presentation of audio to the user and remote user to exemplify the use of the user-monitoring information.

With reference to example FIG. 7, the remote user 204 is shown at 701, which illustrates their audio environment. The telecommunication audio content comprises at least the voice of the remote user 204 as primary audio and at least two instances of ambient secondary audio received from locations 705 (comprising a cat) and 706 (comprising a dog).

The user 200 is shown at 702, which illustrates the audio environment of the user 200 and the spatial audio scene presented to the user 200. The telecommunication audio content from the remote user (primary and secondary audio) happens to be presented such that it is perceived to originate from position 707. The user 200 is also listening to audio of an audio source, which is presented such that it is perceived to originate from position 708. In this example, the audio of the audio source is music, shown by a musical note. There are also some sources of ambient audio surrounding the user 200 at positions 709 (a child) and 710 (a second child).

The user-monitoring information provided by the apparatus 100 may include information indicative of the location 707 comprising the location from which the user 200 is to perceive the telecommunication audio content i.e. position 707.

The remote user 204 is shown at 703 having received said user-monitoring information. Accordingly, the remote apparatus of the remote user device has provided for presentation of the telecommunication audio content at position 711, which corresponds to the position 707. The remote user 204 thus knows where in the spatial audio scene 500 the user 200 is perceiving their telecommunication audio content. This may be advantageous for understanding the remote party's audio scene. Thus, the direction in which the audio content (e.g. primary audio and/or secondary audio) is to be or being perceived by the user relative to a reference direction (e.g the direction the user is facing) may be provided to the remote user device as the user-monitoring information. The audio content can then be presented to the remote user by the remote user device acting on the user-monitoring information to give the remote user an understanding of how their audio content is being presented to the user.

In one or more examples, the user-monitoring information may be indicative of audio of at least one of the one or more audio sources presented to the user as defined in the current audio presentation information for presenting to the remote user 204 by the remote user device 202 or an equivalent remote apparatus thereof. Thus, the user-monitoring information may comprise an audio stream, sent to the remote user device 202, of the audio source audio listened to by the user 200. In one or more examples, audio designated by the user 200 as being private will not be streamed. In one or more examples, the user-monitoring information may be indicative of a reference, such as a URL or link, to at least one (i.e. music represented at 708) of the one or more audio sources presented to the user 200.

The use of the user-monitoring information when it comprises audio source audio or a reference thereto is shown at 704. The remote user 204 is shown at 704 in an audio scene that again includes the telecommunication audio content at position 711, which corresponds to the position 707 and the ambient audio at 706 and 705. However, in addition, based on the user-monitoring information, the remote apparatus may provide for presentation of the music, shown by the musical note, listened to by the user 200 to the remote user 204, as shown at 712, which may correspond to position 708. In this example, the secondary audio of the user-telecommunication audio is presented at positions 713 and 714 corresponding to positions 709 and 710. The child and second child are shown in boxes to illustrate that it is only their audio that is present in the spatial audio scene of the remote user 204 rather than them being physically present with the remote user 204.

It will be appreciated that while the description of FIG. 7 relates to how the remote user device 202 or remote apparatus thereof equivalent to the apparatus 100 may provide for presentation of audio based on the user-monitoring information, the apparatus 100 may perform equivalent actions based on user-monitoring information from the remote user device 202, termed remote-user-monitoring information.

Thus, the apparatus 100, based on remote-user-monitoring information received from the remote user device, may be configured to provide for presentation of the user-telecommunication content to the user 200 such that it will be perceived from a position relative to the user 200 that corresponds to a position relative to the remote user 202 from which the remote user perceives the user-telecommunication content. Accordingly, in this example, the remote-user-monitoring information comprises a presentation position comprising a position relative to the remote user 204 associated with the presentation of the user-telecommunication audio content to the remote user 204 such that the remote user will perceive the user-telecommunication audio content (at least the primary audio thereof) to originate from said presentation position.

In one or more examples, the apparatus 100, based on remote-user-monitoring information received from the remote user device 202, may be configured to provide for presentation, to the user 200, of the audio of at least one of one or more audio sources currently being presented to the remote user 204. In this example, said remote-user-monitoring information received from the remote user device 202 comprises said audio or a reference to the at least one of the one or more audio sources presented to the remote user 202.

Figure 8:
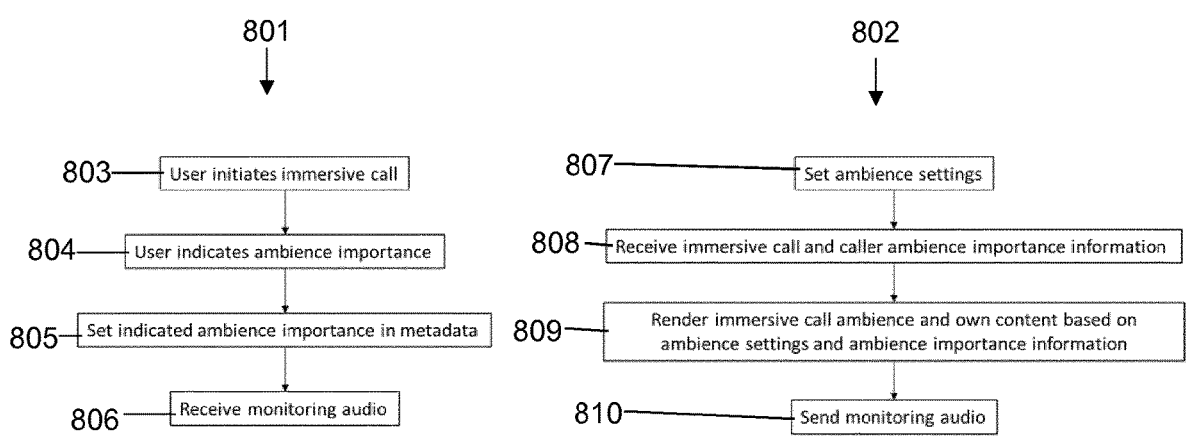
FIG. 8 illustrates the actions of the apparatus and the remote apparatus in conducting the telecommunication call.

FIG. 8 shows a pair of flow charts illustrating the telecommunication call from the point of view of the remote apparatus at 801 and the apparatus 100 at 802. It will be appreciated that typically said telecommunication call is two-way and therefore each apparatus 100 may perform the actions in both flow charts based on at least in part the information and content received from the other.

Accordingly, flow chart 801 illustrates the remote user 204 initiating an immersive telecommunication call at 803. The remote user 204 may further provide user input to indicate the importance of the secondary audio 804. Based on the user input, the appropriate signalling, termed the secondary audio importance information is generated and transmitted at 805. At 806, the remote apparatus may receive the user-monitoring information from the apparatus 100 of the user 200.

Flow chart 802 illustrates the user 200 having the audio of audio sources being presented. At step 807 the user 200 may set the current audio presentation information. At 808, the apparatus 100 may receive the telecommunication audio content from the remote user along with the secondary audio importance information sent at step 805. At step 809, the apparatus 100 may provide for rendering of the audio of the audio sources along with the telecommunication audio content based on the secondary audio importance information and the current audio presentation information and any optional default perceived location.

Accordingly, we also disclose an apparatus 100 configured to provide user-telecommunication audio content to the remote user device 202 for presentation to a remote user 204 via a local user device, said user-telecommunication audio content comprising audio of at least a user of the local user device 201, said telecommunication audio content comprising primary audio and secondary audio. The apparatus 100 may be further configured to provide secondary audio importance information associated with said user-telecommunication audio content that is indicative of an importance of the secondary audio of said user-telecommunication audio content.

Figure 9:
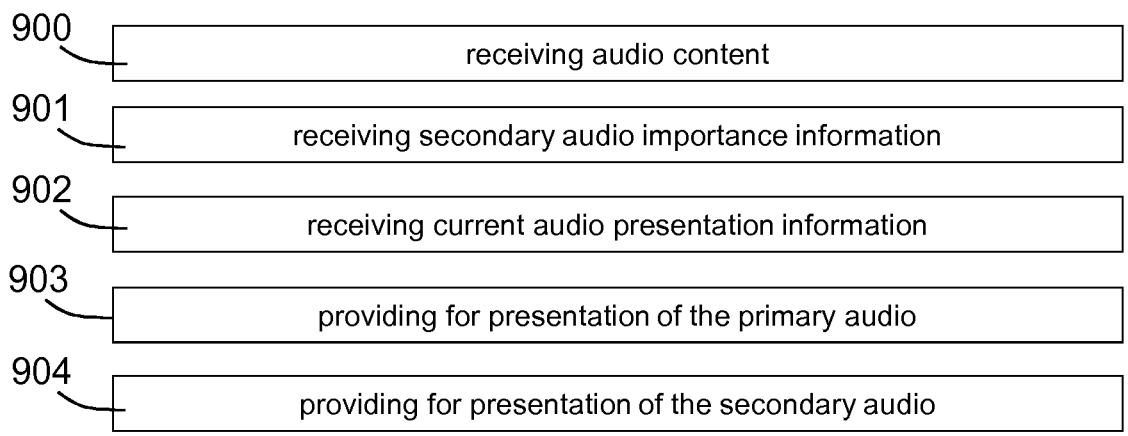
FIG. 9 shows a flowchart illustrating an example method.

FIG. 9 shows a flow diagram illustrating the steps of, receiving 900 audio content from a remote user device, the audio content comprising primary audio and secondary audio, the secondary audio being different to the primary audio and comprising ambient audio;
  receiving 901 secondary audio importance information associated with said audio content and indicative of an importance of the secondary audio;
  receiving 902 current audio presentation information indicative of at least whether audio from one or more audio sources is currently being presented as spatial audio such that respective audio of the one or more audio sources is to be perceived as originating from one or more respective directions or ranges of directions around a reference point;
  providing for presentation 903 of the primary audio; and
  providing for presentation 904 of the secondary audio based on the secondary audio importance information and the current audio presentation information.

Figure 10:
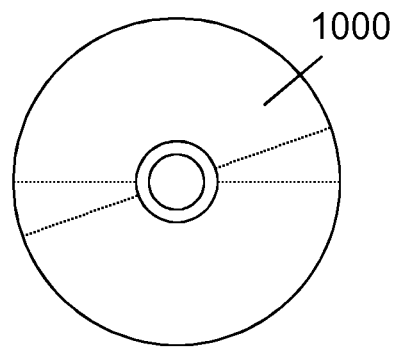
FIG. 10 shows a computer readable medium.

FIG. 10 illustrates schematically a computer/processor readable medium 1000 providing a program according to an example. In this example, the computer/processor readable medium is a disc such as a digital versatile disc (DVD) or a compact disc (CD). In some examples, the computer readable medium may be any medium that has been programmed in such a way as to carry out an inventive function. The computer program code may be distributed between the multiple memories of the same type, or multiple memories of a different type, such as ROM, RAM, flash, hard disk, solid state, etc.

User inputs may be gestures which comprise one or more of a tap, a swipe, a slide, a press, a hold, a rotate gesture, a static hover gesture proximal to the user interface of the device, a moving hover gesture proximal to the device, bending at least part of the device, squeezing at least part of the device, a multi-finger gesture, tilting the device, or flipping a control device. Further the gestures may be any free space user gesture using the user's body, such as their arms, or a stylus or other element suitable for performing free space user gestures.

The apparatus shown in the above examples may be a portable electronic device, a laptop computer, a mobile phone, a Smartphone, a tablet computer, a personal digital assistant, a digital camera, a smartwatch, smart eyewear, a pen based computer, a non-portable electronic device, a desktop computer, a monitor, a smart TV, a server, a wearable apparatus, a virtual reality apparatus, or a module/circuitry for one or more of the same.

Any mentioned apparatus and/or other features of particular mentioned apparatus may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
   at least one processor; and
   at least one memory including computer program code,
   the at least one memory and the computer program code configured to, with the at least one processor, cause the apparatus to perform at least the following:
   receive audio content from a remote user device, the audio content comprising primary audio and secondary audio, the secondary audio being different to the primary audio and comprising ambient audio;
   receive secondary audio importance information associated with said audio content and indicative of an importance of the secondary audio;
   receive current audio presentation information indicative of at least whether audio from one or more audio sources is currently being presented as spatial audio such that respective audio of the one or more audio sources is to be perceived as originating from one or more respective directions or ranges of directions around a reference point;
   provide for presentation of the primary audio; and
   provide for presentation of the secondary audio based on the secondary audio importance information and the current audio presentation information.

2. The apparatus according to claim 1, wherein the secondary audio importance information defines at least two levels of importance comprising important and unimportant and wherein the apparatus is further configured to:
   provide for presentation of the secondary audio based on the secondary audio importance information being indicative of the secondary audio being important, said presentation based on the current audio presentation information; and at least one of:
   provide for presentation of the secondary audio based on the secondary audio importance information being indicative of the secondary audio being unimportant and the current audio presentation information being indicative that none of the one or more audio sources are currently presenting audio; or
   provide for non-presentation of the secondary audio based on the secondary audio importance information being indicative of the secondary audio being unimportant and the current audio presentation information being indicative that at least one of the one or more audio sources are currently presenting audio.

3. The apparatus according to claim 2, wherein the apparatus is further configured to:
   provide for presentation of the secondary audio, based on the secondary audio importance information being indicative of the secondary audio being important and the current audio presentation information being indicative of at least one of the one or more audio sources currently presenting audio, and provide for modification of one or both of a volume or the range of directions with which the audio of at least one of the one or more audio sources is presented to accommodate presentation of the secondary audio.

4. The apparatus according to claim 2, wherein the apparatus is further configured to:
   provide for presentation of the secondary audio such that it is perceived as originating from all directions around the user, based on the secondary audio importance information being indicative of the secondary audio being important and the current audio presentation information being indicative that none of the one or more audio sources are currently presenting audio.

5. The apparatus according to claim 1, wherein the apparatus is further configured to:
   provide for presentation of the primary audio as spatial audio such that it is to be perceived as originating from a direction or range of directions that is non-overlapping with a direction or range of directions associated with the audio of the one or more audio sources based on the current audio presentation information.

6. The apparatus according to claim 1, wherein the apparatus is further configured to:
   receive default perceived location information which defines a default perceived location for the audio content; and
   provide for presentation of at least said primary audio of said audio content as spatial audio to be perceived as originating from said default perceived location.

7. The apparatus according to claim 1, wherein the apparatus is further configured to:
   capture user audio content of a user;
   send said captured user audio content to the remote user device to provide for telecommunication between the user and the remote user of the remote user device, wherein said user audio content comprises primary audio and secondary audio, the secondary audio being different to the primary audio and comprising ambient audio; and
   send secondary audio importance information associated with said user audio content and indicative of an importance of the secondary audio of the user audio content for use by the remote user device, the secondary audio importance information based on user input received from the user.

8. The apparatus according to claim 7, wherein the secondary audio importance information is based on one or more of:
   audio analysis of the user audio content; or
   a determined current location of the user.

9. The apparatus according to claim 7, wherein the apparatus is further configured to, on determination that the secondary audio importance information associated with said captured user audio content is indicative of the user audio content being unimportant, modify the captured user audio content from being categorised as primary audio and secondary audio to one of monophonic or stereophonic audio prior to said sending of the captured user audio content or capture the user audio content as one of monophonic and stereophonic.

10. The apparatus according to claim 1, wherein the apparatus is further configured to:
send user-monitoring information to the remote user device, the user-monitoring information indicative of whether or not the secondary audio is being presented for at least notifying said remote user or remote user device.

11. The apparatus according to claim 1, wherein the apparatus is further configured to:
send user-monitoring information to the remote user device, the user-monitoring information indicative of one or more of:
a presentation direction comprising a direction defined relative to a reference direction comprising from where the audio content is to be perceived when the apparatus is in use, the presentation direction for use in presenting the audio content to the remote user by the remote user device;
audio of at least one of the one or more audio sources presented to the user as defined in the current audio presentation information for presenting to the remote user by the remote user device; or
a reference to at least one of the one or more audio sources presented to the user as defined in the current audio presentation information from which the audio can be retrieved for presenting said audio of the at least one of the one or more audio sources to the remote user by the remote user device.

12. The apparatus according to claim 7, wherein the apparatus is further configured to:
receive remote-user-monitoring information from the remote user device, and one or more of:
provide for presentation of the user audio content to be perceived as originating from a position corresponding to a presentation position, wherein the remote-user-monitoring information from the remote user device comprises the presentation position which is indicative of a position relative to the remote user from where the user audio content is to be perceived when presented by the remote user device; or
provide for presentation of the audio of at least one of one or more audio sources currently being presented to the remote user, wherein said remote-user-monitoring information received from the remote user device comprises said audio or a reference to the at least one of the one or more audio sources presented to the remote user.

13. A method, the method comprising:
receiving audio content from a remote user device, the audio content comprising primary audio and secondary audio, the secondary audio being different to the primary audio and comprising ambient audio;
receiving secondary audio importance information associated with said audio content and indicative of an importance of the secondary audio;
receiving current audio presentation information indicative of at least whether audio from one or more audio sources is currently being presented as spatial audio such that respective audio of the one or more audio sources is to be perceived as originating from one or more respective directions or ranges of directions around a reference point;
providing for presentation of the primary audio; and
providing for presentation of the secondary audio based on the secondary audio importance information and the current audio presentation information.

14. The method according to claim 13, wherein the secondary audio importance information defines at least two levels of importance comprising important and unimportant and wherein the method further comprising:
providing for presentation of the secondary audio based on the secondary audio importance information being indicative of the secondary audio being important, said presentation based on the current audio presentation information; and at least one of:
providing for presentation of the secondary audio based on the secondary audio importance information being indicative of the secondary audio being unimportant and the current audio presentation information being indicative that none of the one or more audio sources are currently presenting audio; or
providing for non-presentation of the secondary audio based on the secondary audio importance information being indicative of the secondary audio being unimportant and the current audio presentation information being indicative that at least one of the one or more audio sources are currently presenting audio.

15. The method according to claim 14, further comprising:
providing for presentation of the secondary audio, based on the secondary audio importance information being indicative of the secondary audio being important and the current audio presentation information being indicative of at least one of the one or more audio sources currently presenting audio, and providing for modification of one or both of a volume or the range of directions with which the audio of at least one of the one or more audio sources is presented to accommodate presentation of the secondary audio.

16. The method according to claim 14, further comprising:
providing for presentation of the secondary audio such that it is perceived as originating from all directions around the user, based on the secondary audio importance information being indicative of the secondary audio being important and the current audio presentation information being indicative that none of the one or more audio sources are currently presenting audio.

17. The method according to claim 13, further comprising:
providing for presentation of the primary audio as spatial audio such that it is to be perceived as originating from a direction or range of directions that is non-overlapping with a direction or range of directions associated with the audio of the one or more audio sources based on the current audio presentation information.

18. The method according to claim 13, further comprising:
receiving default perceived location information which defines a default perceived location for the audio content; and
providing for presentation of at least said primary audio of said audio content as spatial audio to be perceived as originating from said default perceived location.

19. The method according to claim 1, further comprising:

capturing user audio content of a user;

sending said captured user audio content to the remote user device to provide for telecommunication between the user and the remote user of the remote user device, wherein said user audio content comprises primary audio and secondary audio, the secondary audio being different to the primary audio and comprising ambient audio; and sending secondary audio importance information associated with said user audio content and indicative of an importance of the secondary audio of the user audio content for use by the remote user device, the secondary audio importance information based on user input received from the user.

20. A non-transitory computer readable medium comprising program instructions stored thereon for performing at least the following:

receiving audio content from a remote user device, the audio content comprising primary audio and secondary audio, the secondary audio being different to the primary audio and comprising ambient audio;

receiving secondary audio importance information associated with said audio content and indicative of an importance of the secondary audio;

receiving current audio presentation information indicative of at least whether audio from one or more audio sources is currently being presented as spatial audio such that respective audio of the one or more audio sources is to be perceived as originating from one or more respective directions or ranges of directions around a reference point;

providing for presentation of the primary audio; and providing for presentation of the secondary audio based on the secondary audio importance information and the current audio presentation information.

\* \* \* \* \*